United States Patent
Green et al.

(10) Patent No.: US 7,709,782 B2
(45) Date of Patent: May 4, 2010

(54) OPTICAL ASSEMBLY WITH ADJUSTABLE OPTICAL ELEMENT AND INDEPENDENTLY TUNABLE POSITION SENSORS

(75) Inventors: Evan Drake Harriaman Green, San Jose, CA (US); Carl Iacono, Livermore, CA (US); Jan-Willem Pieterse, San Jose, CA (US)

(73) Assignee: Newport Corporation, Irvine, CA (US)

( * ) Notice: Subject to any disclaimer, the term of this patent is extended or adjusted under 35 U.S.C. 154(b) by 666 days.

(21) Appl. No.: 11/653,809

(22) Filed: Jan. 16, 2007

(65) Prior Publication Data

US 2007/0187578 A1    Aug. 16, 2007

Related U.S. Application Data

(60) Provisional application No. 60/759,839, filed on Jan. 17, 2006.

(51) Int. Cl.
  *H01J 40/14* (2006.01)
(52) U.S. Cl. .................................. 250/221; 250/201.3
(58) Field of Classification Search .................. 250/221, 250/201.1–201.4, 216; 359/554–557; 396/55, 396/72, 73, 85, 349
  See application file for complete search history.

(56) References Cited

U.S. PATENT DOCUMENTS

| | | | |
|---|---|---|---|
| 5,668,655 A | 9/1997 | Schweizer et al. | |
| 5,786,936 A | * | 7/1998 | Baumann et al. ............ 359/557 |
| 5,803,609 A | 9/1998 | Stacklies et al. | |
| 5,864,215 A | 1/1999 | Shen et al. | |
| 6,987,626 B2 | 1/2006 | Green | |

FOREIGN PATENT DOCUMENTS

DE    103 03 266 A1    8/2004

OTHER PUBLICATIONS

Search Report and Written Opinion for PCT International Application No. PCT/US2007/001019 (related to the present application), Jun. 6, 2007.
International Preliminary Report on Patentability and Written Opinion for PCT/US07/001019 (related to the present application), publication date Jul. 31, 2008, Bookham Technology plc.

* cited by examiner

*Primary Examiner*—Que T Le
(74) *Attorney, Agent, or Firm*—Roeder & Broder LLP

(57) ABSTRACT

A device assembly (16) for a precision apparatus (10) includes a device housing (30), a device (32), a device mover assembly (34), and a measurement system (36). The device mover assembly (34) moves the device (32) relative to the device housing (30) about a first axis and about a second axis that is orthogonal to the first axis. The measurement system (36) monitors movement of the device (32). The measurement system (36) monitors movement of the device (32) and can include a first sensor assembly (260) that monitors movement about the first axis and a second sensor assembly (262) that monitors movement about a second axis. Each sensor assembly (260) (262) can include a sensor adjuster (474) (476) that adjusts the position of a portion of the respective sensor assembly (260) (262) to independently tune the sensor assemblies (260) (262) and independently enhance the performance of each sensor assembly (260) (262). Further, each sensor assembly (260) (262) can be a magnetic type sensor.

24 Claims, 6 Drawing Sheets

OPTICAL ASSEMBLY WITH ADJUSTABLE OPTICAL ELEMENT AND INDEPENDENTLY TUNABLE POSITION SENSORS

RELATED APPLICATION

This application claims priority on Provisional Application Ser. No. 60/759,839 filed on Jan. 17, 2006 and entitled "OPTICAL ASSEMBLY WITH ADJUSTABLE SENSORS". As far as is permitted, the contents of Provisional Application Ser. No. 60/759,839 are incorporated herein by reference.

BACKGROUND

Optical mirrors are commonly used in precision apparatuses to make precise adjustments to the path of a beam. For example, the precision apparatus can include a beam source that generates a beam, an object, and an optical mirror that redirects the beam at the object. In certain situations, the performance of the precision apparatus is enhanced if the beam travels in a controlled environment. With this design, one or more tubes extend between the beam source and the object, and the mirror is positioned within the tubes. Unfortunately, with this design, the mirror is not visible and information regarding the movement and position of the optical mirror is not readily available.

SUMMARY

The present invention is directed to a device assembly for a precision apparatus that includes an apparatus frame. The device assembly includes a device housing, a device, a device mover assembly, and a measurement system. The device housing is secured to the apparatus frame. The device mover assembly moves the device relative to the device housing about a first axis and about a second axis that is substantially orthogonal to the first axis. The measurement system includes a first sensor assembly that independently monitors movement about the first axis and a second sensor assembly that independently monitors movement about a second axis. In one embodiment, each sensor assembly includes a first adjuster that adjusts the position of a portion of the respective sensor assembly to independently tune the sensor assemblies. With this design, in certain embodiments, the gain and/or offset of each of the sensor assemblies can be independently adjusted, and the performance of each sensor assembly can be independently optimized. This improves the accuracy of the measurement system and can reduce the cross-coupling of the sensor signals from the two adjusters.

In one embodiment, each sensor assembly includes a device sensor component that is coupled to the device and moves with the device, and a housing sensor component that is coupled to the housing. Preferred sensors can be of a non-contacting in nature. Further, each sensor assembly can be a magnetic type sensor. For example, for each sensor assembly, (i) one of the sensor components can include a Hall-effect sensor, and (ii) the other sensor component can include a magnet array that interacts with the hall effect sensor and that is spaced apart from the hall effect sensor.

In one embodiment, for each sensor assembly, the first adjuster adjusts the position of the housing sensor component relative to the device sensor component. For example, for each sensor assembly, the first adjuster allows for movement of the housing sensor component along a third axis and about the third axis relative to the device sensor component. In one embodiment, for each sensor assembly, the first adjuster includes an adjuster housing that defines a housing component receiver that receives the housing sensor component, and a housing fastener that selectively secures the housing sensor component to the adjuster housing. The housing component receiver can be an cylindrical shaped aperture that receives the housing sensor component and allows the housing sensor component to move along the third axis and about the third axis relative to the adjuster housing. The adjustment of the housing sensor component along the third axis allows adjustment of the sensor to match a desired device mover position (rotation about the first or second axis) to a desired sensor output signal level (sensed rotation about the first or second axis). The adjustment of the housing sensor component about the third axis allows adjustment of the sensor to establish a minimal level of cross-coupling of first sensor output signal changes due to second device mover position changes and vice-versa.

Additionally, each sensor assembly can include a second adjuster that adjusts the position of the respective device sensor component relative to the device along the first axis (or second axis) and about the third axis (about the third axis isn't a critical direction). In one embodiment, for each sensor assembly, the second adjuster includes a component holder that retains the device sensor component, the component holder including a holder slot that allows for movement of the component holder relative to the device. The adjustment of the device sensor component along the first or second axis allows adjustment of the sensor to match a desired device mover position range to a desired sensor output signal level range.

The present invention is also directed to an optical assembly that includes a device housing, an element assembly, a device mover assembly, and a measurement system. The element assembly includes an optical element and an element holder that holds the optical element. The device mover assembly moves the element assembly relative to the device housing about the first axis and about the second axis. In one embodiment, the measurement system includes a first hall effect sensor that monitors movement of the element assembly about the first axis and a second hall effect sensor that monitors movement of the element assembly about the second axis.

Additionally, the present invention is also directed to a precision apparatus that includes a beam source that generates a beam, an object, and the optical assembly directing the beam at the object.

Moreover, the present invention is also directed to a method for redirecting a beam on a beam path.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
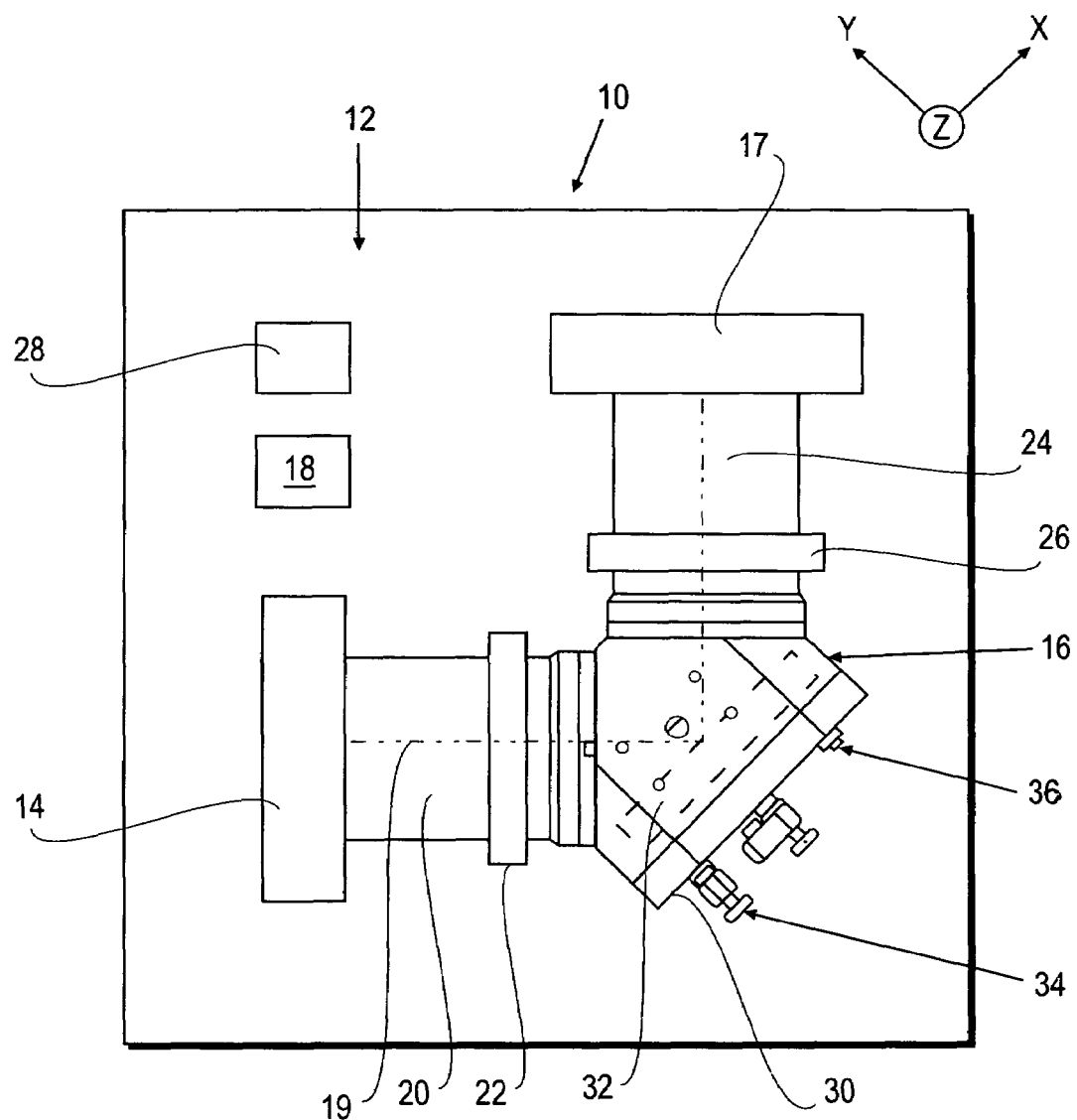
FIG. 1 is a simplified illustration of a precision apparatus having features of the present invention.

Referring to FIG. 1, the present invention is directed to a precision apparatus 10 that, for example, can be used in manufacturing, technical or scientific instruments. As an example, the precision apparatus 10 can be a measurement system, e.g. a laser interferometer, encoder, and/or other measuring device (also precision apparatus 10 can be a laser exposure system, e.g. a photolithography exposure tool or laser cutting tool). The design and orientation of the components of the precision apparatus 10 can be changed to suit the requirements of the precision apparatus 10. FIG. 1 is a simplified top view of one, non-exclusive example of the precision apparatus 10. In this embodiment, the precision apparatus 10 includes an apparatus frame 12, a beam source 14, a device assembly 16, an object 17, and a control system 18. However, one or more of these components can be optional.

A number of Figures include an orientation system that illustrates an X axis, a Y axis that is orthogonal to the X axis, and a Z axis that is orthogonal to the X and Y axes. It should be noted that any of these axes can also be referred to as the first, second, and third axes. In general, there are six degrees of freedom, including translation along the X, Y and Z axes and rotation about the X, Y and Z axes.

The apparatus frame 12 retains and/or supports the other components of the precision apparatus 10. In one embodiment, the apparatus frame 12 is generally rectangular plate shaped and is made of a rigid material.

The beam source 14 generates a beam 19 (illustrated in phantom) of light energy that is directed at the device assembly 16. In one embodiment, the beam source 14 is a laser source and the beam 19 is a small diameter optical beam.

The device assembly 16 is positioned in the path of the beam 19. In one embodiment, the device assembly 16 is an optical assembly that redirects the beam 19 at the object 17. Alternatively, for example, the device assembly 16 can be used to otherwise alter the beam.

As non-exclusive examples, the object 17 can be a mirror, lens, telescope, filter, emitter, sensor, and/or detector.

The control system 18 controls the operation of one or more of the assemblies of the precision apparatus 10. In one embodiment, the control system 18 includes a processor (not shown) and a display (not shown).

As illustrated in FIG. 1, the apparatus 10 also includes (i) a first tube 20 that extends between the beam source 14 and the device assembly 16, the first tube 20 including a first mounting region 22 that fits over and selectively secures the first tube 20 to the device assembly 16, (ii) a first seal (not shown), e.g. an "O" ring type seal, that seals the first tube 20 to the device assembly 16, (iii) a second tube 24 that extends between the object 17 and the device assembly 16, the second tube 24 including a second mounting region 26 that fits over and selectively secures the second tube 24 to the device assembly 16, and (iv) a second seal (not shown), e.g. an "O" ring type seal, that seals the second tube 24 to the device assembly 16. With this design, the beam 19 can travel from the beam source 14 to the object 17 in a sealed, controlled environment. In non-exclusive, alternative environments, the controlled environment can be a vacuum, an inert gas, or another type of fluid.

Additionally, the precision apparatus 10 can include an environmental controller 28 that provides the controlled environment for the beam 19 to travel. For example, the environmental controller 28 can include a reservoir that contains an inert gas, and/or one or more pumps.

In one embodiment, the device assembly 16 includes a device housing 30 that is secured to the apparatus frame 12, a device 32 (illustrated in phantom) that is coupled to the device housing 30, a device mover assembly 34 that moves the device 32 relative to the device housing 30, and a measurement system 36 that monitors movement of the device 32 relative to the device housing 30. With this design, information regarding movement and/or the position of the device 32 can be transferred to the control system 18. For example, the movement and/or position of the device 32 can be displayed on the display for reference or stored for future analysis. Alternatively, for example, with information regarding movement and/or position, the operation of the device mover assembly 34 can be controlled in a closed loop fashion.

In certain embodiments, the device mover assembly 34 moves and positions the device 32 about two axes (e.g. about the X axis and about the Z axis), and the measurement system 36 monitors the position of the device about the two axes. Further, the position of measurement system 36 is selectively adjustable so that operation of the measurement system 36 can improved, and the gain and/or offset and/or cross-coupling of the measurement system 36 can be adjusted.

It should be noted that the device assembly 16 can also include a circuit board and/or and electrical connector for electrically connecting the electrical components of the device assembly 16 to the rest of the precision apparatus 10. This circuit board and electrical connector are not illustrated in the Figures so that other components of the device assembly 16 are not hidden.

Figure 2A:
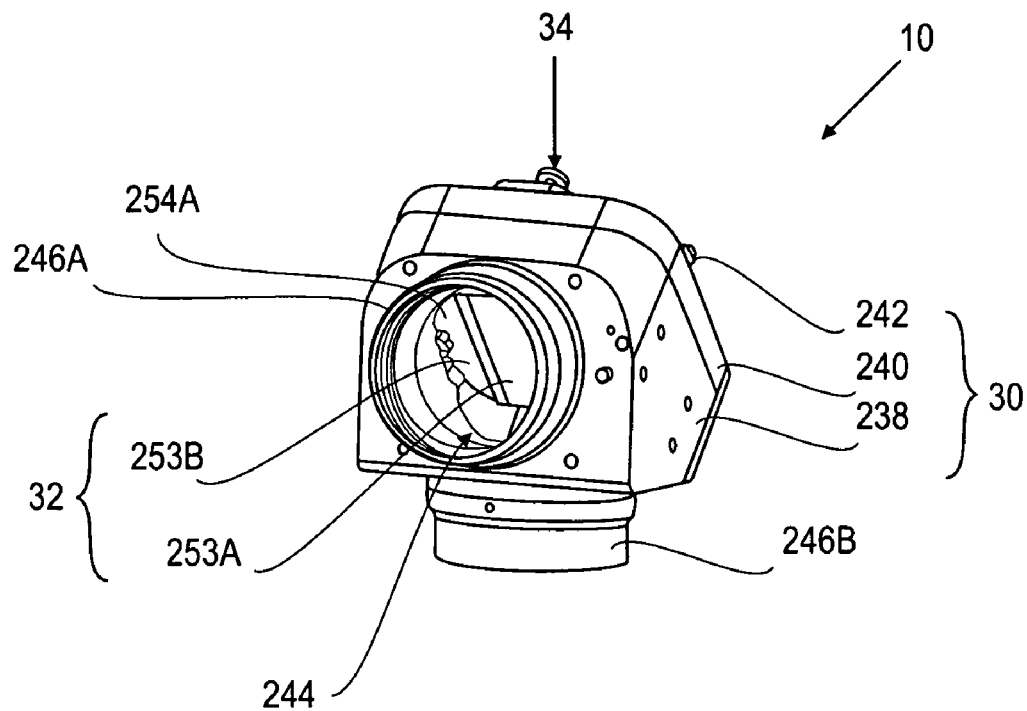
FIGS. 2A and 2B are alternative perspective views of a first embodiment of a device assembly having features of the present invention.
Figure 2B:
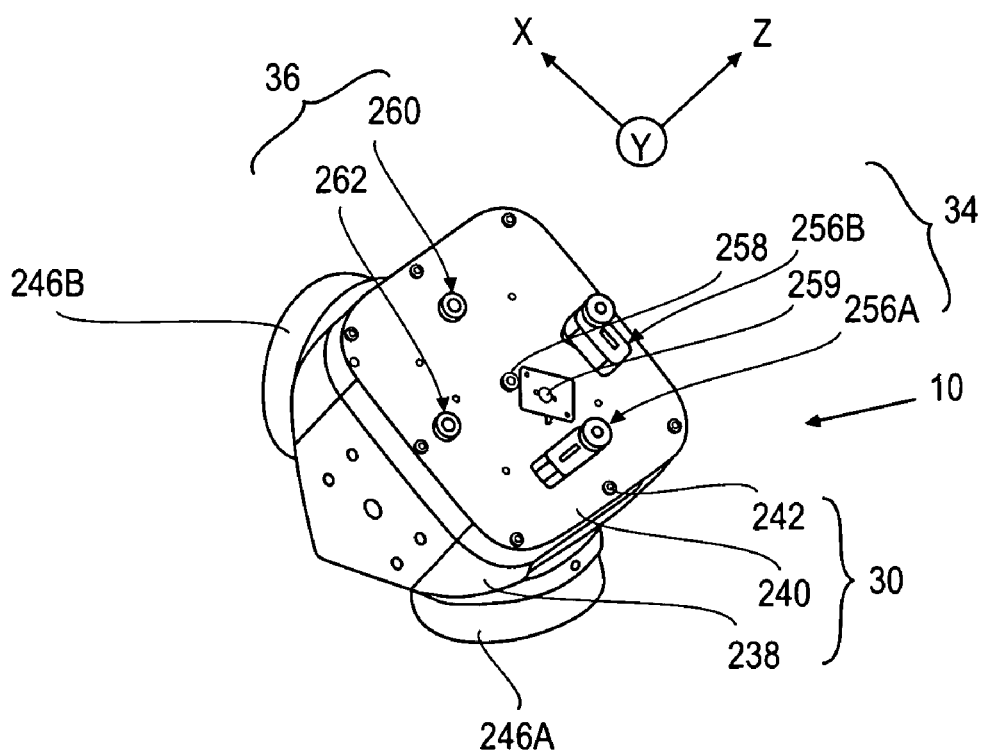

FIGS. 2A and 2B are alternative perspective views of the device assembly 16 that can be used in the apparatus 10 of FIG. 1 or another type of apparatus 10. In this embodiment, the device assembly 16 includes the device housing 30, the device 32, the device mover assembly 34, and the measurement system 36. The size, shape, and design of each of these components can be varied to achieve the design requirements for the device assembly 16. It should be noted that the device assembly 16 can be designed without one or more of the components described above.

The device housing 30 retains and supports the other components of the device assembly 16. In one embodiment, the device housing 30 is secured to the apparatus frame 12 (illustrated in FIG. 1) and the housing 30 couples the other components of the device assembly 16 to the apparatus frame 12. In one embodiment, the device housing 30 includes a body section 238 that is secured to the apparatus frame 12, a removable section 240 that is selectively secured to the body section 238, and a fastener assembly 242 that selectively secures the removable section 240 to the body section 238.

Figure 3A:
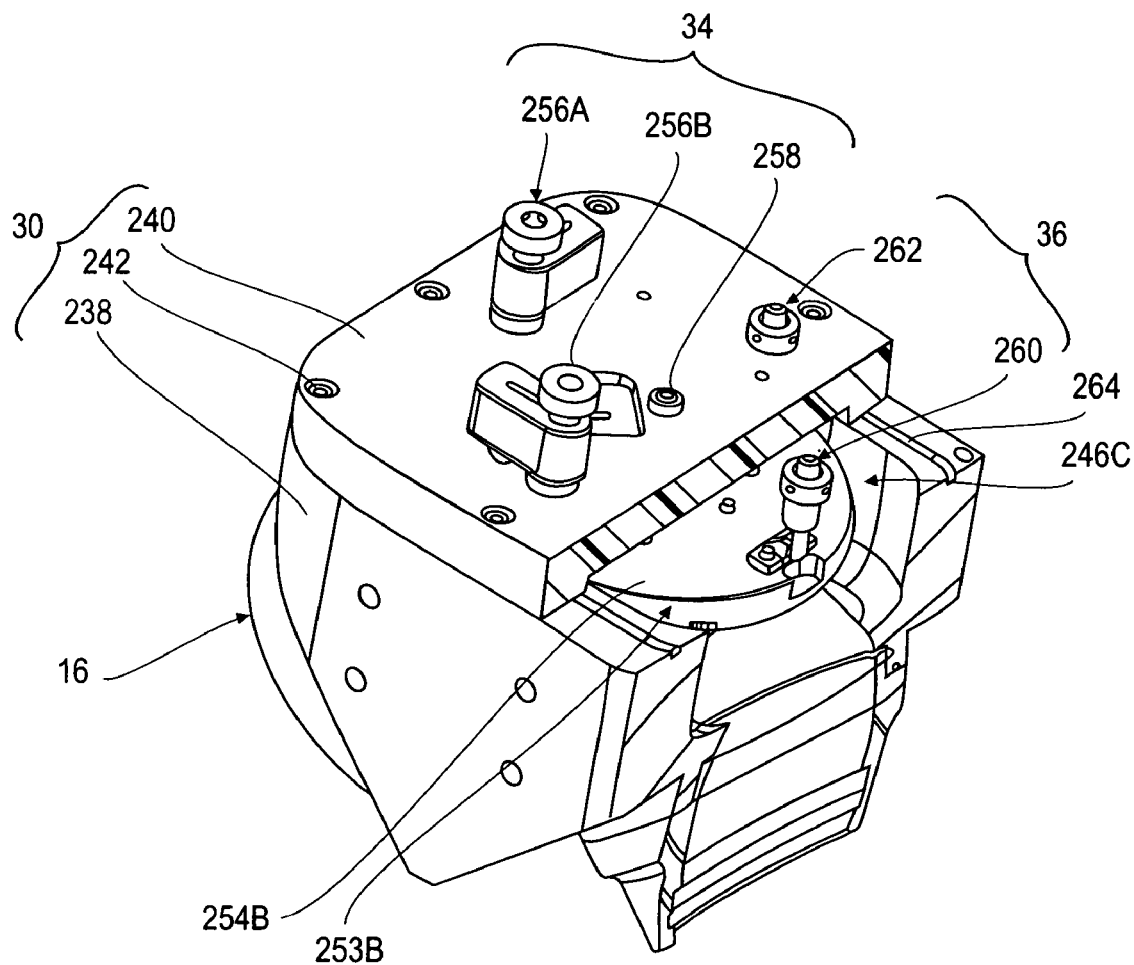
FIG. 3A is a partly cut-away perspective view of the device assembly.

In one embodiment, the body section 238 is defines a housing cavity 244 that receives the device 32, and includes (i) a first mounting flange 246A that defines a first body opening, (ii) a second mounting flange 246B that defines a second body opening, and (iii) a rear body opening 246C (illustrated in FIG. 3A). In this embodiment, the body section 238 is shaped somewhat similarly to a pipe elbow with the first mounting flange 246A and the second mounting flange 246B at approximately 90 degrees relative to each other and the rear body opening 246C positioned at the rear of the body section 238. Alternatively, the mounting flanges 246A, 246B and the rear body opening 246C can be located in other positions.

In one embodiment, the first body opening and the second body opening are each a circular type opening and the rear body opening 246C is generally rectangular shaped opening. Further, in certain embodiments, the rear body opening 246C is large enough so that the device 32 can pass easily through the rear body opening 246C into the housing cavity 244. Alternatively, the body openings can have other shapes or sizes.

In one embodiment, the beam 19 (illustrated in FIG. 1) from the beam source 14 (illustrated in FIG. 1) passes through the first body opening to the device 32. Subsequently, the beam 19 passes through the second body opening to the object 18 (illustrated in FIG. 1).

The removable section 240 is removably secured to the body section 238 and the removable section 240 secures the device 32, the device mover assembly 34, and the measurement system 36 to the body section 238. With this design, in certain embodiments, the removable section 240 can be selectively removed to repair or replace the device 32, the device mover assembly 34 and/or the measurement system 36 without removing the rest of the housing 240 from the tubes 20, 24 (illustrated in FIG. 1) and the rest of the apparatus 10 (illustrated in FIG. 1). Further, the device 32 is supported by a rigid mechanical housing 230 so that the device 32 is less susceptible to long term or operating misalignments.

In one embodiment, the removable section 240 is sized and shaped to cover the rear body opening 246C. In one embodiment, the removable section 240 corresponds to the shape of the rear body opening 246C and is generally rectangular plate shaped. Alternatively, the removable section 240 can have another shape. For example, the removable section 240 can include (i) a plurality of spaced apart sensor apertures 248 (illustrated in FIG. 4) for securing the measurement system 36 to the removable section 240, (ii) a plurality of spaced apart fastener apertures 250 (illustrated in FIG. 4) that are positioned along the perimeter of the removable section 240, and (iii) a plurality of spaced apart mover apertures 252 (illustrated in FIG. 4) for securing the device mover assembly 34 to the removable section 240.

The body section 238 and the removable section 240 can be made of a rigid material. Non-exclusive examples of suitable materials include steel, plastic, aluminum, or invar.

The fastener assembly 242 selectively secures the removable section 240 to the body section 238. In one embodiment, the fastener assembly 242 includes a plurality of bolts that fit through the fastener apertures 250 and thread into the body section 238 to secure the removable section 240 to the body section 238. Alternatively, for example, the fastener assembly 242 can include an adhesive, or another type of clamp.

In one embodiment, the device 32 includes an optical element 253A, and an element holder 253B. For example, the optical element 253A can be used to redirect the beam 19 (illustrated in FIG. 1) that is directed to the object 17 (illustrated in FIG. 1). In one embodiment, the optical element 253A is a generally disk shaped reflective element, e.g. a mirror. Alternatively, for example, the optical element 253A can be an optical filter, a polarizer, a prism, a filter wheel, a light source, a beam steerer, or another type of optical component or source.

The element holder 253B retains the optical element 253A and provides a rigid frame for securing the optical element 253A to the removable section 240. In certain embodiments, the element holder 253B supports the optical element 253A so that the device mover assembly 34 can move the optical element 253A without distorting or damaging the optical element 253A. Further, the element holder 253B can retain the optical element 253A in a fashion that allows for the easy removal of the optical element 253A from the element holder 253B. For example, the optical element 253A can be secured to the element holder 253B with an adhesive. In one embodiment, the element holder 253B is generally disk shaped and includes a front side 254A that faces the optical element 253A and an opposed rear side 254B (illustrated in FIG. 3A).

The device mover assembly 34 precisely adjusts the position of the optical element 253A relative to the device housing 30 and the rest of the apparatus 10 (illustrated in FIG. 1). With this design, the position of the optical element 253A can be adjusted until the beam 19 is precisely directed to the object 17. For example, the device mover assembly 34 can be used to adjust the position of the optical element 253A and the element holder 253B relative to the device housing 30 with one to six degrees of motion. The design of the device mover assembly 34 can vary. For example, the device mover assembly 34 can include one or more manually and/or electrically driven movers or actuators. In the embodiments illustrated herein, the device mover assembly 34 includes a first electronic mover 256A that electronically moves the optical element 253A, a second electronic mover 256B that electronically moves the optical element 253A and the element holder 253B, and one manual mover 258. With this design, the device mover assembly 34 can move the optical element 253A and the element holder 253B with three degrees of movement, namely translation along the Y axis (with the adjustment of all three movers 256A, 256B, and 258), rotation about the X axis (with the second electronic mover 256B), and rotation about the Z axis (with the first electronic mover 256A).

Alternatively, any combination of manual and/or motorized movers 256A, 256B, 258 can be used. For example, the manual mover 258 can be replaced with an electronic mover, the electronic movers 256A, 256B can be replaced with manual movers, or one or more of the movers 256A, 256B, 258 can be eliminated.

The design and operation of each mover 256A, 256B, 258 can be altered depending upon the requirements of the precision apparatus 10. In FIGS. 2A and 2B, each electronic mover 256A, 256B is a piezoelectric driven actuator that is secured to the removable section 240 and that extends through the mover aperture 252 in the removable section 240. One example of an actuator which may be used are those sold under the trade name "New Focus Picomotor" available from New Focus, Inc., San Jose, Calif. Other actuators include magnetostrictive actuators such as those available from Energen and piezoactuators. One embodiment of an actuator is described in U.S. Pat. No. 5,410,206, issued to Luecke et al. and assigned to New Focus, Inc., the contents of which are incorporated herein by reference.

In one embodiment, the manual mover 258 includes a threaded set screw that is threaded into the mover aperture 252 in the removable section 240. Alternatively, the movers 256A, 256B, 258 can have another design. For example, each electronic mover 256A, 256B can be another type of electronic actuator, such as a linear motor, a rotary motor, or a voice coil motor.

In FIGS. 2A and 2B, the manual mover 258 engages the device 32 near the center of the device 32 and the electronic movers 256A, 256B are spaced apart and are at approximately 90 degrees relative to each other. Alternatively, the location of the movers 256A, 256B, 258 can be different than illustrated in the Figures.

Additionally, the device mover assembly 16 can include one or more resilient members 259 that urges the device 32 against the movers 256A, 256B, 258. For example, a spring can be used to urge the device 32 against the movers 256A, 256B, 258. In this example, the spring can extend between the removable section 240 of the device housing 30 and the element holder 253B.

The measurement system 36 monitors movement and/or the position of the device 32 relative to the device housing 30 or some other reference. In one embodiment, the measurement system 36 monitors movement of the device 32 about the X and Z axes. In FIGS. 2A and 2B, the measurement system 36 includes a first sensor assembly 260 that independently monitors movement of the device 32 about the Z axis and a spaced apart, second sensor assembly 262 that independently monitors movement of the device 32 about the X axis.

The design of the sensors assemblies 260, 262 can vary pursuant to the teachings provided herein. In one embodiment, each sensor 260, 262 is a magnetic type sensor. In certain embodiments, the position of each of the sensor 260, 262 is selectively adjustable so each the sensors 260, 262 can be moved and positioned to enhance the performance of the sensors 260, 262. This feature allows for independent calibration of the sensors 260, 262.

Figure 2C:
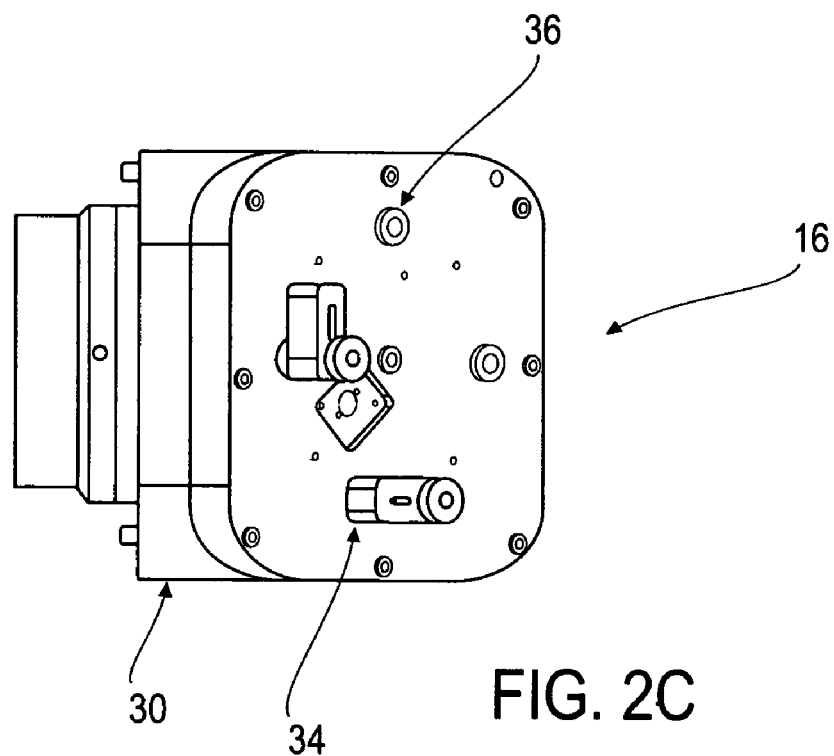
FIGS. 2C and 2D are alternative plan views of the device assembly.
Figure 2D:
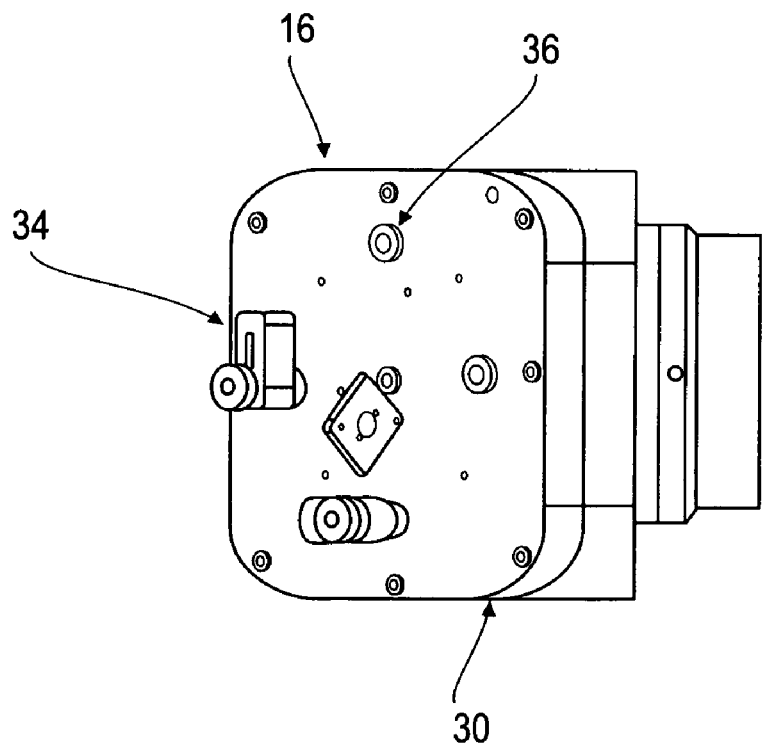

FIGS. 2C and 2D are alternative plan view of the device assembly 16, including the device housing 30, the device mover assembly 34, and the measurement system 36.

FIG. 3A is a partly cut-away perspective view of the device assembly 16 including (i) the body section 238, the removable section 240 and the fastener assembly 242 of the device housing 30, (ii) the rear side 254B of the element holder 253B, (iii) the electronic movers 256A, 256B, and the manual mover 258 of the device mover assembly 34, and (iv) the first sensor assembly 260 and the second sensor assembly 262 of the measurement system 36.

Additionally, FIG. 3A illustrates that the device housing 30 includes a housing seal 264 that seals the removable section 240 to the body section 238. For example, the housing seal assembly 264 can include an "O" ring type seal that is positioned between the removable section 240 to the body section 238. Additionally, the threads that extend through removable section 240 can be greased screw threads that act as seals. However, other designs for the housing seal 264 can be utilized.

As mention above, in certain embodiments, the removable section 240 is removed relatively easily from the body section 238. Further, in certain embodiments, the optical element 253A, the element holder 253B, the device mover assembly 34, and the measurement system 36 are removed simultaneously with the removable section 240. This unique design allows for the components of the device assembly 16 to be repaired and adjusted relatively easily.

Figure 3B:
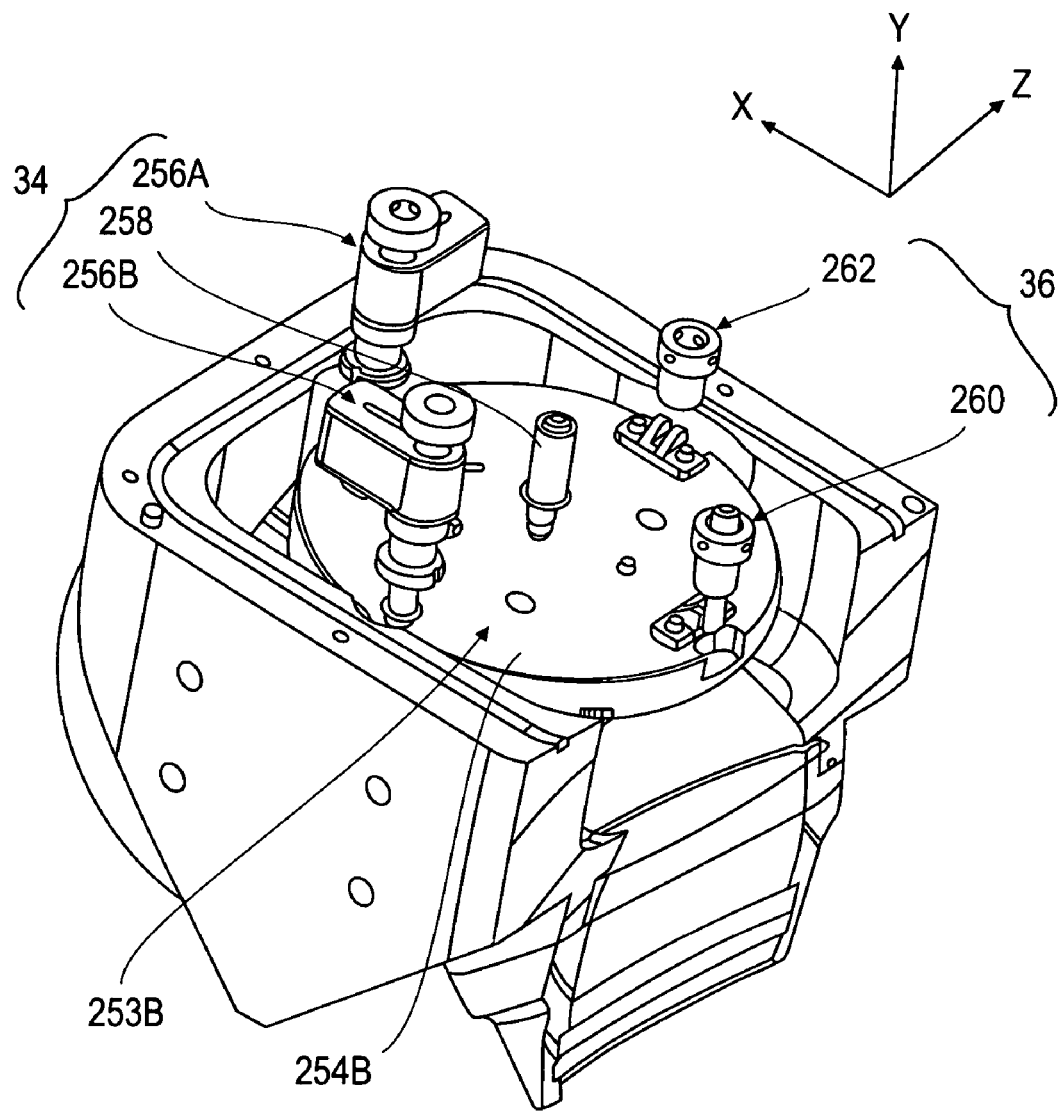
FIG. 3B is a partly cut-away perspective view of the device assembly with a portion of the device assembly not shown.

FIG. 3B is a partly cut-away perspective view of the device assembly 16 of FIG. 3A with the removable section and the fastener assembly of the body section 238 not shown. Additionally, a portion of the second sensor assembly 262 is not illustrated in FIG. 3B.

In one embodiment, the device mover assembly 34 is coupled to the element holder 253B in a kinematic fashion. This inhibits the device mover assembly 34 from deforming the element holder 253B and the optical element (not shown in FIG. 3B). For example, a distal end of each mover 256A, 256B, 258 can be coupled to the rear side 254B of the element holder 253B with a kinematic gimbal arrangement. In this embodiment, the manual mover 258 can be positioned directly behind the optic center of the optical element.

Alternatively, for example, a distal end of each mover 256A, 256B, 258 can include a ball tip and the rear side 254B of the element holder 253B can include (i) a cone that is engaged by the ball tip of one of the movers 256A, 256B, 258, (ii) a vee that is engaged by the ball tip of one of the movers 256A, 256B, 258, and (i) a flat area that is engaged by the ball tip of one of the movers 256A, 256B, 258.

It should be noted that other kinematic arrangements can be utilized. For example, the rear side 254B of the element holder 253B can include three vees. Still alternatively, the device mover assembly 34 can be coupled to the element holder 253B in a non-kinematic fashion, such as with flexural and rolling element bearings.

Further, in one embodiment, the coupling between the device mover assembly 34 and the element holder 253B provides a relatively low friction and highly consistent connection between the device mover assembly 34 and the element holder 253B that allows for precise and easily repeatable positioning of optical element.

FIG. 3B also illustrates that the manual mover 258 engages the element holder 253B at the center and the electronic movers 256A, 256B are at 90 degrees relative to each other. With this design, (i) movement of the first electronic mover 256A up and down causes the element holder 253B to pivot about the Z axis, and (ii) movement of the second electronic mover 256B up and down causes the element holder 253B to pivot about the X axis.

FIG. 3B also illustrates that (i) the sensor assemblies 260, 262 are at 90 degrees relative to each other, (ii) the first sensor assembly 260 is 180 degrees from the first electronic mover 256A with the manual mover 258 there between, and (iii) the second sensor assembly 262 is 180 degrees from the second electronic mover 256B with the manual mover 258 there between. With this design, (i) the first sensor assembly 260 can monitor movement of the element holder 253B about the Z axis, and (ii) the second sensor assembly 262 can monitor movement of the element holder 253B about the X axis.

Figure 4:
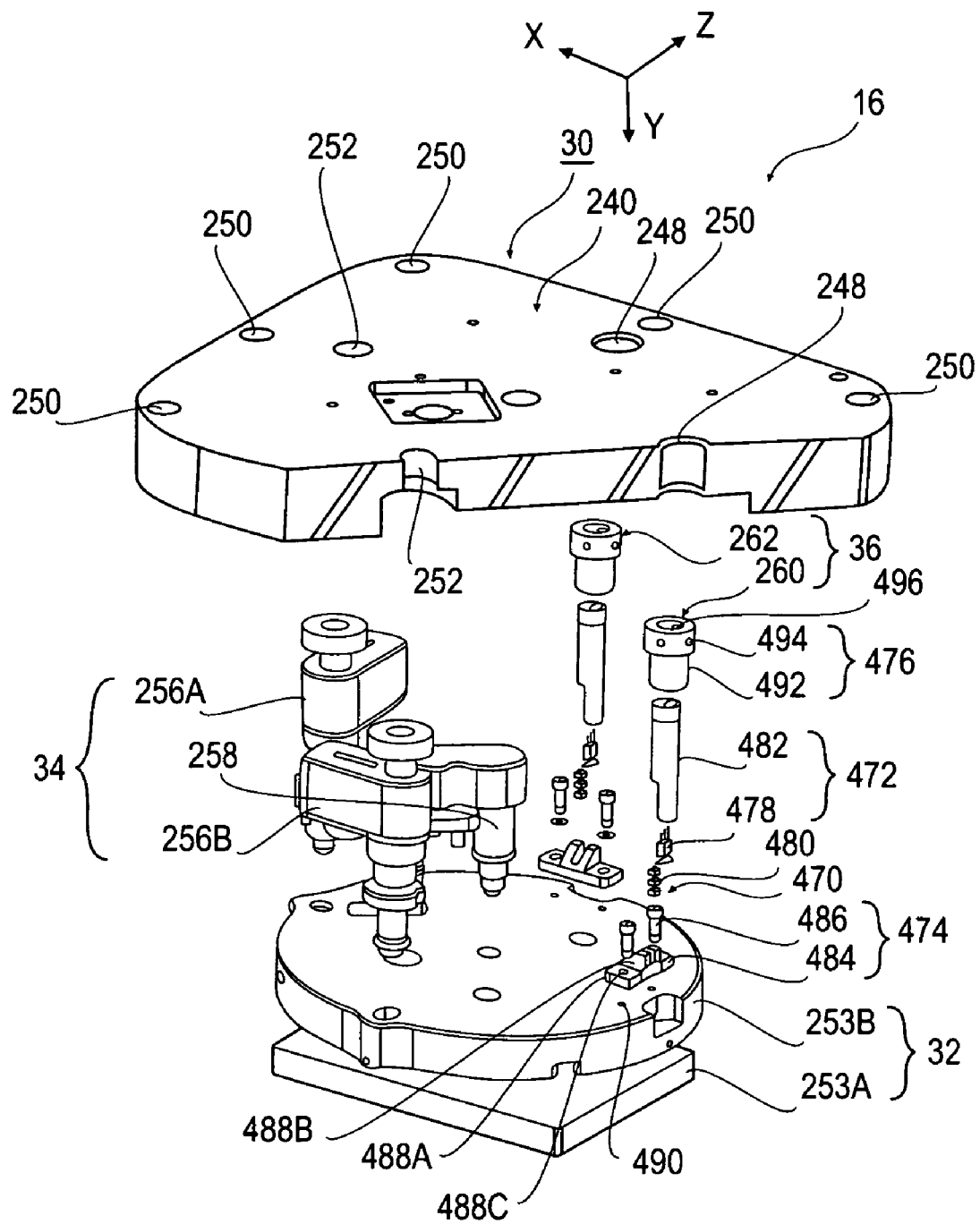
FIG. 4 is an exploded perspective view of a portion of the device assembly.

FIG. 4 is an exploded perspective view of a portion of the device assembly 16. In particular, FIG. 4 illustrates (i) the removable section 240 (in partial cut-away) of the device housing 30, (ii) the optical element 253A and the element holder 253B of the device 32, (iii) the movers 256A, 256B, 258 of the device mover assembly 34, and (iv) the sensor assemblies 260, 262 of the measurement system 36.

In one embodiment, each sensor assembly 260, 262 includes a device sensor component 470, a housing sensor component 472, a device sensor adjuster 474, and a housing sensor adjuster 476. It should be noted that either of the sensor components 470, 472 can also be referred to as a first or second sensor component, and/or either of the sensor adjusters 474, 476 can also be referred to as a first or second adjuster. Additionally, it should also be noted that each sensor assembly 260, 262 can be designed without one of the adjusters 474, 476.

For each sensor assembly 260, 262, the device sensor component 470 is secured to and moves with the element holder 253B and the housing sensor component 472 is secured to the removable section 240 of the device housing 30. Further, for each sensor assembly 260, 262, the device sensor component 470 interacts with the housing sensor component 472 to monitor movement, and the sensor components 470, 472 are spaced apart.

In one embodiment, for each sensor assembly 260, 262, one of the sensor components 470, 472 includes a hall effect sensor 478, and the other one of the sensor components 472, 470 includes a magnet array 480. In FIG. 4, the housing sensor component 472 includes the hall effect sensor 478 and the device sensor component 470 includes the magnet array 480. Alternatively, these components can be switched.

The design of each hall effect sensor 478 and each magnet array 480 can vary. In FIG. 4, each hall effect sensor 478 is secured to a right cylindrical shaped sensor body 482. Further, the magnet array 480 includes one or more magnets. In FIG. 4, the magnet array 480 includes three stacked magnets.

For each sensor assembly 260, 262, (i) the device sensor adjuster 474 can be used to adjust the position of the device sensor component 470 relative to the element holder 253B, the optical element 253A, and the respective housing sensor component 472, and (ii) the housing sensor adjuster 476 can be used to adjust the position of the housing sensor component 472 relative to the device housing 30, and the respective device sensor component 470. With this design, for each sensor assembly 260, 262, the sensor adjusters 474, 476 can be used to independently tune the sensor assemblies 260, 262. With this design, in certain embodiments, the gain and/or offset and/or cross-coupling of each of the sensor assemblies 260, 262 can be independently adjusted, and the performance of each sensor assemblies 260, 262 can be independently optimized.

In one embodiment, for each sensor assembly 260, 262, the device sensor adjuster 474 can be used to adjust the position of the device sensor component 470 along the X axis, along the Z axis and about the Y axis. For example, each device sensor adjuster 474 can include a component holder 484 that retains the device sensor component 470 and a holder fastener assembly 486 that secures the component holder 484 to the element holder 253B. In FIG. 4, the component holder 484 includes a generally flat, holder base region 488A and a pair of spaced apart, triangular shaped cantilevering regions 488B that cantilever upward from the holder base region 488A. In this embodiment, the magnet array 480 is positioned between the cantilevering regions 488B and secured to the component holder 484. For example, the magnet array 480 can be secured with an adhesive to the component holder 484.

In one embodiment, the holder base region 488A includes a pair of spaced apart, holder slots 488C. Further, the holder fastener assembly 486 includes a pair of spaced apart bolts that extend through the holder slots 488C and thread into threaded apertures 490 in the element holder 253B. Further, the holder slots 488C are wider than the body of the bolts. With this design, when the bolts are loose, the position of the component holder 484 can be moved relative to the element holder 253B along the X axis, along the Z axis and about the Y axis. Subsequently, when the device sensor component 470 is properly positioned, the bolts can be tightened to inhibit relative movement between the component holder 484 and the element holder 253B. In certain embodiments, movement of the sensor component along the X axis influences gain for the sensor assembly, movement of the sensor component along the Z axis influences cross coupling of the sensor assembly and slightly influences gain of the sensor assembly, and movement about the Y axis influences cross coupling of the sensor assembly.

Somewhat similarly, in one embodiment, for each sensor assembly 260, 262, the housing sensor adjuster 476 can be used to adjust the position of the housing sensor component 472 along the Y axis, and about the Y axis. In FIG. 4, for each sensor assembly 260, 262, the housing sensor adjuster 476 includes an adjuster housing 492 and a housing fastener assembly 494. In this embodiment, each adjuster housing 492 is somewhat tubular shaped, fits into one of the sensor apertures 248, and is fixedly secured to the removable section 240. Further, the adjuster housing 492 defines a housing component receiver 496 that receives the housing sensor component 472. In one embodiment, the housing component receiver 496 is a cylindrical shaped aperture that receives the cylindrical shaped sensor body 482 and allows the housing sensor component 472 to move up and down along the Y axis and rotate about the Y axis relative to the adjuster housing 492. In certain embodiments, movement of the sensor component along the Y axis influences offset for the sensor assembly, and movement about the Y axis influences cross coupling of the sensor assembly.

The housing fastener assembly 494 selectively secures the housing sensor component 472 to the adjuster housing 492. In FIG. 4, the housing fastener assembly 494 includes a pair set screws that are threaded into a threaded housing aperture (not shown) of the adjuster housing 492. With this design, the set screws can be used to selectively urge against the housing sensor component 472 to inhibit motion between the housing sensor component 472 and the adjuster housing 492.

With the present invention, for each sensor assembly 260, 262, the relative positions of the device sensor component 470 and the housing sensor component 472 can be precisely and independently adjusted. For example, magnetic fields for magnet arrays 480 can vary greatly for different magnet arrays 480. Further, the manufacturing tolerances can lead to poor relative positioning between the sensor components 470, 472 of one or both sensor assemblies 260, 262. The present invention allows for the precise and independent adjustments in the relative positions of the sensor components 470, 472 of both sensor assemblies 260, 262. With this design, for example, for each sensor assemblies 260, 262, one or both of the sensor components 470, 472 can be moved until the respective hall effect sensor 478 has the desired output. Thus, in certain embodiments, the present invention allows for independent calibration and tuning of the sensor assemblies 260, 262.

While the particular apparatus 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A device assembly for a precision apparatus that includes an apparatus frame, the device assembly comprising:
   a device housing that is secured to the apparatus frame;
   a device;
   a device mover assembly that moves the device relative to the device housing about a first axis and about a second axis that is substantially orthogonal to the first axis; and
   a measurement system that monitors movement of the device, the measurement system including a first sensor assembly that monitors movement of the device about the first axis and a second sensor assembly that monitors movement of the device about the second axis; wherein each sensor assembly includes a first sensor adjuster that adjusts of the position of a portion of the respective sensor assembly to independently tune the sensor assemblies.

2. The device assembly of claim 1 wherein each sensor assembly includes a device sensor component that is coupled to the device and moves with the device, and a housing sensor component that is coupled to the device housing, and wherein for each sensor assembly, the first sensor adjuster adjusts the position of the housing sensor component relative to the device sensor component.

3. The device assembly of claim 2 wherein for each sensor assembly, the first sensor adjuster allows for movement of the housing sensor component along a third axis and about the third axis relative to the device sensor component.

4. The device assembly of claim 3 wherein for each sensor assembly, the first sensor adjuster includes an adjuster housing that defines a housing component receiver that receives the housing sensor component, and a housing fastener assembly that selectively secures the housing sensor component to the adjuster housing.

5. The device assembly of claim 4 wherein the housing component receiver is an cylindrical shaped aperture that receives the housing sensor component and allows the housing sensor component to move along the third axis and about the third axis relative to the adjuster housing.

6. The device assembly of claim 3 wherein each sensor assembly includes a second sensor adjuster that adjusts the position of the respective device sensor component relative to the device.

7. The device assembly of claim 6 wherein for each sensor assembly, the second sensor adjuster adjusts the position of the device sensor component along the first axis and about the third axis.

8. The device assembly of claim 1 wherein each sensor assembly includes a device sensor component that is coupled to the device and moves with the device, and a housing sensor component that is coupled to the housing, and wherein for each sensor assembly, the first sensor adjuster adjusts the position of the device sensor component relative to the device.

9. The device assembly of claim 8 wherein for each sensor assembly, the first sensor adjuster adjusts the position of the device sensor component along the first axis.

10. The device assembly of claim 9 wherein for each sensor assembly, the first sensor adjuster includes a component holder that retains the device sensor component, the component holder including a holder slot that allows for movement of the component holder relative to the device.

11. The device assembly of claim 1 wherein the device includes an optical element and an element holder that retains the optical element, and a portion of each sensor assembly is secured to the element holder.

12. The device assembly of claim 1 wherein each sensor assembly includes a device sensor component that is coupled to the device and moves with the device, and a housing sensor component that is coupled to the housing, and wherein for each sensor assembly, one of the sensor components includes a hall effect sensor and the other sensor component includes a magnet array that is spaced apart from the hall effect sensor.

13. The device assembly of claim 1 wherein each sensor assembly is a magnetic type sensor.

14. A precision apparatus comprising a beam source that generates a beam, an object, and the device assembly of claim 1 directing the beam at the object.

15. An optical assembly for a precision apparatus that includes an apparatus frame, the optical assembly comprising:
   a device housing that is secured to the apparatus frame;
   an element assembly that includes an optical element and an element holder that holds the optical element;
   a device mover assembly that moves the element assembly relative to the device housing about a first axis and about a second axis that is orthogonal to the first axis; and
   a measurement system that monitors movement of the element assembly, the measurement system including a first sensor assembly that monitors movement of the element assembly about the first axis and a second sensor assembly that monitors movement of the element assembly about the second axis, wherein each sensor assembly is a magnetic type sensor.

16. The optical assembly of claim 15 wherein each sensor assembly includes a device sensor component that is coupled to the element holder and moves with the element holder, and a housing sensor component that is coupled to the housing, and wherein for each sensor assembly, one of the sensor components includes a hall effect sensor and the other sensor component includes a magnet array that is spaced apart from the hall effect sensor.

17. The optical assembly of claim 15 wherein each sensor assembly includes a first sensor adjuster that adjusts of the position of a portion of the respective sensor assembly to independently tune the sensor assemblies.

18. The optical assembly of claim 17 wherein each sensor assembly includes a device sensor component that is coupled to the element holder and moves with the element holder, and a housing sensor component that is coupled to the housing, and wherein for each sensor assembly, the first sensor adjuster adjusts the position of the housing sensor component along a third axis and about the third axis relative to the device sensor component.

19. The optical assembly of claim 18 wherein each sensor assembly includes a second sensor adjuster that adjusts the position of the respective device sensor component along the first axis and about the third axis relative to the element holder.

20. A precision apparatus comprising a beam source that generates a beam, an object, and the optical assembly of claim 15 directing the beam at the object.

21. A method for redirecting a beam, the method comprising the steps of;
   providing a device housing;
   positioning an optical element in the path of the beam;
   moving the optical element relative to the device housing about a first axis and about a second axis that is orthogonal to the first axis;
   monitoring movement of the optical element about the first axis with a first sensor assembly, the first sensor assembly including a device sensor component that is coupled to the optical element and a housing sensor component that is coupled to the device housing;
   monitoring movement of the optical element about the second axis with a second sensor assembly, the second sensor assembly including a device sensor component that is coupled to the optical element and a housing sensor component that is coupled to the device housing;
   adjusting the position of one of the sensor components of the first sensor assembly to tune the first sensor assembly; and
   adjusting the position of one of the sensor components of the second sensor assembly to tune the second sensor assembly.

22. The method of claim 21 wherein the steps of adjusting includes moving the respective housing sensor component along a third axis and about the third axis.

23. The method of claim 22 wherein the steps of adjusting includes moving the respective device sensor component along the first axis and about the third axis.

24. The method of claim 21 wherein the steps of adjusting includes moving the respective device sensor component along the first axis and about a third axis.

* * * * *